United States Patent [19]
Fujimoto et al.

[11] Patent Number: 5,982,524
[45] Date of Patent: Nov. 9, 1999

[54] OPTICAL SCANNING APPARATUS

[75] Inventors: Osamu Fujimoto, Yamatokoriyama; Hideo Matsuda; Yoichi Shimazawa, both of Nara; Kazuyuki Ohnishi, Yamatokoriyama; Hidekazu Sakagami, Sakurai, all of Japan

[73] Assignee: Sharp Kabushiki Kaisha, Japan

[21] Appl. No.: 08/924,699

[22] Filed: Sep. 5, 1997

[30] Foreign Application Priority Data

Sep. 5, 1996 [JP] Japan ................................. 8-234794

[51] Int. Cl.⁶ ................. G02B 26/08; G02B 5/10
[52] U.S. Cl. ........................... 359/208; 359/868
[58] Field of Search ................... 359/208, 868, 359/869, 216, 219

[56] References Cited

U.S. PATENT DOCUMENTS

| 4,398,787 | 8/1983 | Balasubramanian | 359/208 |
| 5,025,268 | 6/1991 | Arimoto et al. | |
| 5,353,047 | 10/1994 | Nakamura et al. | |

FOREIGN PATENT DOCUMENTS

| 3922982 A1 | 1/1990 | Germany. | |
| 62-253116 | 11/1987 | Japan. | |
| 0055517 | 5/1988 | Japan | 359/208 |
| 0741117 | 6/1980 | U.S.S.R. | 359/208 |

*Primary Examiner*—Cassandra Spyrou
*Assistant Examiner*—Jared Treas
*Attorney, Agent, or Firm*—Nixon & Vanderhye P.C.

[57] ABSTRACT

The present invention is intended to reduce a fθ correction error by correcting an error of an object scanning speed which is produced because a reflecting point of a laser beam moves on a polygon mirror. In an inventive laser scanner, laser light emitted from a laser oscillator is condensed into a beam by a condenser lens at first. This laser beam is reflected by a polygon mirror rotated by a scanning section and is reflected again to a photoreceptor by a curved reflecting mirror. A curved profile of a reflecting plane of the curved reflecting mirror in the main scanning direction is formed so as to be asymmetrical on right and left bounding about a scanning center point. Thereby, variation of speed for scanning the curved reflecting mirror by the light reflected by the polygon mirror may be canceled by the curved reflecting mirror and a speed for scanning the object may be fixed almost at a predetermined speed.

10 Claims, 10 Drawing Sheets

Fθ CORRECTION ERROR

Fθ CORRECTION ERROR

OPTICAL SCANNING APPARATUS

BACKGROUND OF THE INVENTION

1. Field of the Invention

The present invention relates to an optical scanning apparatus for one-dimensionally scanning an object by light and more particularly to an optical scanning apparatus for use in a laser bar code reader, a laser printer, a laser facsimile, a laser text reader, a digital copier and the like.

2. Description of Related Art

A laser scanner is an apparatus for scanning an object by laser light. In general, the laser scanner is constructed so as to reflect laser light emitted from a laser oscillator by a scanning mirror which rotates or reciprocates and to one-dimensionally scan the surface of an object by the reflected light. A correcting lens or mirror is provided between a predetermined plane of the object and the scanning mirror in order to irradiate laser light in focus and to scan the object at a predetermined scanning speed. A direction in which the laser light is irradiated is changed and the scanning speed is corrected by causing the reflected light to pass through the correcting lens or by reflecting the reflected laser light again by the mirror. Or, thereby, a focal position is changed.

FIG. 10 is a diagram showing a structure of a typical laser scanner according to a first prior art technology. The laser scanner comprises a laser oscillator 31, a condenser lens 32, a one plane mirror 33, imaging lenses 35, a light receiving element 36 and a return mirror 37. The one-plane mirror 33 is a scanning mirror for deflecting a laser beam so that it scans within a predetermined scanning range. It has a single reflecting plane and is provided with an axis of rotation within the reflecting plane so as to be angularly displaceable. The laser beam emitted from the laser oscillator 31 is condensed by the condenser lens 32 to be reflected in an arbitrary direction by the one plane mirror 33. The reflected laser beam is imaged on a scanning position 34 on a predetermined line segment within the plane by the imaging lens 35 which is a fθ lens. The return mirror 37 reflects the laser beam imaged out of the above-mentioned line segment among the laser beams which have passed through the imaging lens 35 so as to guide to the light receiving element 36. The light receiving element 36 is disposed right before the scanning position 34 to detect the position of the laser beam which has passed through the imaging lens 35.

FIG. 11 is a diagram showing a structure of a typical laser scanner according to a second prior art technology. The structure of this laser scanner is the same with the laser scanner shown in FIG. 10, except of that the imaging lens 35 is replaced by a curved reflecting mirror 38. The curved reflecting mirror 38 allows the same effect with that of the imaging lens 35 to be obtained and its reflecting plane is formed by a spherical plane whose radius of curvature in the main scanning direction of the laser beam is fixed. In this laser scanner, the laser beam reflected by the one plane mirror 33 is reflected again by the curved reflecting mirror 38 to image at the scanning position 34. A number of proposals have been made since the past as to the concrete structure of the lenses and mirrors composing the laser scanners shown in FIGS. 10 and 11.

While an object scanning speed which is a speed at which the laser beam scans the surface of the object may be increased by increasing the speed of rotation of the one plane mirror 33 in the laser scanners shown in FIGS. 10 and 11, there is a limit in the increase of the speed of rotation because the faster the speed of the rotation, the more complicated the structure of a mechanism for rotating the one plane mirror 33 becomes and the harder the control of the rotation thereof becomes. Therefore, a polygon mirror having a plurality of reflecting planes is normally used instead of the one-plane mirror in increasing the object scanning speed. When the polygon mirror is used, however, the position of reflecting point in the reflecting plane where the laser beam is reflected changes corresponding to an angle of rotation of the polygon mirror because the center of rotation of the polygon mirror is separated considerably from the reflecting planes. The variation of the position of the reflecting point varies depending on the size of an inscribed circle of the polygon mirror and the larger the inscribed circle, the greater the variation becomes.

FIG. 12 is a diagrammatic view for explaining an angular displacement of the reflecting plane of the polygon mirror and changes of the reflecting point. The polygon mirror 39 is assumed to be rotated in the direction indicated by an arrow A centering on the center of rotation C.

In a first state when the laser beam starts to enter one reflecting plane of the polygon mirror 39, the reflecting plane is positioned so that the laser beam 20 condensed by the condenser lens 32 enters the reflecting plane with an incident angle of 45 degrees or more as indicated by a solid line 39a. In the first state, the laser beam 20 reflects at a reflecting point P1 and is deflected in the direction indicated by an arrow 21.

When the polygon mirror 39 is rotated further from the first state, the reflecting plane is positioned so that the laser beam 20 enters the reflecting plane with an angle of 45 degrees as indicated by a two-dot chain line 39b. In the second state, the laser beam 20 reflects at a reflecting point P2 and is deflected in the direction indicated by an arrow 22. The reflecting point P2 is located on an imaginary axis containing an optical path of the laser beam 20 and behind the reflecting point P1 in the incident direction of the laser beam 20. Therefore, the reflecting point moves from the reflecting point P1 to the reflecting point P2 in the direction indicated by an arrow a1 during when the polygon mirror 39 is rotated so as to put the reflecting plane into the second state from the first state.

When the polygon mirror 39 rotates further from the second state, the reflecting plane is positioned so that the laser beam 20 enters the reflecting plane with an incident angle of less than 45 degrees as indicated by a broken line 39c. The laser beam 20 reflects again at the reflecting point P1 and is deflected in the direction indicated by an arrow 23 in this third state. Therefore, when the polygon mirror 39 rotates so as to put the reflecting plane into the third state from the second state, the reflecting point moves from the reflecting point P2 to the reflecting point P1 in the direction indicated by an arrow a2. When the polygon mirror 39 is rotated so as to put the reflecting plane into the first through third states sequentially, the reflecting point reciprocates on the imaginary axis.

The reflecting point will not move as described above when the axis of rotation of the one plane mirror 33 is made to coincide with the reflecting plane in rotating the one plane mirror 33 because the reflecting point within the reflecting plane is always fixed. Therefore, a range in which the laser beam reflected by the one plane mirror can be deflected is bisected by the laser beam which is reflected by the one plane mirror 33 at 45 degrees. Because the reflecting point moves when the one plane mirror 33 of the laser scanner shown in FIGS. 10 and 11 is replaced by the polygon mirror 39 as described above, the linearity of scan at the scanning position 34 corrected by the imaging lens 35 or the curved reflecting mirror 38 drops considerably as compared to the case of using the one plane mirror 33. Further, thereby, the range in which the laser beam reflected by the polygon mirror 39 can be deflected will not be bisected even if the laser beam which is reflected by the polygon mirror 35 at 45 degrees is set as a boundary.

For instance, in the above-mentioned range, a first range to which the laser beam whose reflecting angle at the polygon mirror 39 is 45 degrees or more is emitted, i.e. a range from the direction indicated by the arrow 21 to the direction indicated by the arrow 22, is narrower than a range to which the laser beam whose reflecting angle at the one plane mirror 33 is 45 degrees or more is emitted. Conversely, a second range to which the laser beam whose reflecting angle at the polygon mirror 39 is 45 degree or less is emitted, i.e. a range from the direction indicated by the arrow 22 to the direction indicated by the arrow 23, is wider than the range to which the laser beam whose reflecting angle at the one plane mirror 33 is 45 degrees or less is emitted.

Accordingly, if the speed of rotation of the reflecting plane of the polygon mirror 39 is equal with the speed of rotation of the reflecting plane of the one plane mirror 33, the speed for scanning the curved reflecting mirror 38 by the laser beam emitted in the first range is slower than the speed for scanning the curved reflecting mirror 38 by the laser beam reflected by the one plane mirror 33, bounding the laser beam whose reflecting angle at the polygon mirror 39 is 45 degrees. Conversely, the speed for scanning the curved reflecting mirror 38 by the laser beam emitted to the second range is faster than the speed for scanning the curved reflecting mirror 38 by the laser beam reflected by the one plane mirror 33. The object scanning speed in scanning the object by reflecting those laser beams by the curved reflecting mirror is proportional to the scanning speed of the curved reflecting mirror 38. From these facts, when the polygon mirror is used as the scanning mirror, the object scanning speed is not kept at a predetermined speed, producing a large error in the scanning speed. Therefore, a fθ correction error may increase.

As a prior art technology of this laser scanner, there has been an optical scanning apparatus using an optical scanning curved mirror as disclosed in Japanese Unexamined Patent Publication JP-A 62-253116 (1987). This optical scanning apparatus is constructed so as to deflect light emitted from a light source by a scanning mirror and to reflect this light by an optical scanning curved mirror to condense and image linearly on a photoreceptor drum. A curved profile of this optical scanning curved mirror in the direction orthogonal to a locus on which a reflecting point where the light deflected by the scanning mirror is reflected moves is slanted such that an incident angle of the light increases gradually from the middle part to the both ends in order to deflect the light deflected by the scanning mirror in the direction intersecting with the plane of deflection of the light. Because the curved profile in the direction parallel with the locus in the reflecting planes of the optical scanning curved mirror is nearly parabolic, the radius of curvature thereof is almost fixed. Therefore, it is difficult to prevent the error of the object scanning speed described above.

SUMMARY OF THE INVENTION

It is hence an object of the present invention to provide an optical scanning apparatus which causes less scanning speed error, i.e. less fθ correction error, in an optical scanning apparatus using a single curved reflecting mirror and a scanning mirror whose center of rotation is separated from reflecting planes.

In a first aspect the invention provides an optical scanning apparatus comprising:

a light source for emitting light;

a scanning mirror having reflecting planes for reflecting the light emitted from the light source;

rotating means for rotating the scanning mirror; and curved reflecting mirror having a curved reflecting plane for reflecting the light reflected by the reflecting planes of the scanning mirror to an object, wherein a curved profile of the reflecting plane of the curved reflecting mirror along a locus on which a point to which the light reflected by the reflecting plane of the scanning mirror is reflected moves is formed such that a portion of the curved profile from a scanning center point of the curved reflecting mirror which is the point at which the light is reflected when the light reflected by the reflecting plane of the curved reflecting mirror is reflected nearly toward the center of a scanning range to one end of the locus and a portion of the curved profile from the scanning center point to the other end of the locus are asymmetrical about the scanning center point of the curved reflecting mirror.

According to the first aspect of the invention, the optical scanning apparatus reflects the light emitted from the light source by the reflecting plane of the scanning mirror which is rotated by the rotating means. Thereby, the light emitted from the light source is reflected in a different direction corresponding to an angle of rotation of the scanning mirror, so that the light is deflected in an arbitrary direction within the plane of rotation of the scanning mirror. This light is reflected at one point in the reflecting plane of the curved reflecting mirror and hits against the surface of the object. The direction in which this light is inputted to the curved reflecting mirror, i.e. the direction of this light reflected by the scanning mirror, is different corresponding to the angle of rotation of the scanning mirror, so that the angle of reflection on the curved reflecting mirror also changes corresponding to the angle of rotation of the scanning mirror. Accordingly, the point at which the light hits on the surface of the object changes along the rotation of the scanning mirror, so that the surface of the object is scanned by this light. The range to which this light can hit corresponding to the angle of rotation of the scanning mirror is the scanning range.

At this time, the reflecting plane of the curved reflecting mirror is formed so as to be asymmetrical at right and left about the scanning center point. Thereby, even when the distribution of the points at which the light reflected by the scanning mirror hits on the surface of the curved reflecting mirror is biased by the move of the reflecting point on the scanning mirror, the points at which the light reflected by the curved reflecting mirror hits within the scanning range are uniformly distributed. Therefore, even when there is an error in the speed for scanning the curved reflecting mirror due to the move of the reflecting point, the speed for scanning the object may be corrected at a fixed speed. Thereby, the surface of the object to be scanned may be scanned almost at a predetermined scanning speed. Accordingly, an optical scanning apparatus excellent in terms of the fθ correction can be provided.

In a second aspect the invention is characterized in that the curved profile of the reflecting plane of the curved reflecting mirror along the locus is formed such that a radius of curvature of one of the two portions of the curved profile on a side opposite to a light incident side with respect to a reference axis parallel with a direction in which the light is reflected by the scanning mirror to the scanning center point, the reference axis passing a point at which the light is reflected within the reflecting plane of the scanning mirror when the light is reflected to the ends of the locus, increases from the scanning center point to the end of the reflecting plane and a radius of curvature of the other of the two portions of the curved profile on the light incident side with respect to the reference axis decreases from the scanning center point to the end of the reflecting plane.

According to the invention, the curved plane of the curved reflecting mirror is formed so that its radius of curvature turns out as described above. Thereby, when the radius of curvature at the scanning center point is equal with a radius of curvature of the prior art curved reflecting mirror, the radius of curvature is longer than the radius of curvature of the prior art curved reflecting mirror whose radius of curvature is fixed on the side of the former and the radius of curvature is shorter than the radius of curvature of the prior art curved reflecting mirror on the side of the latter. Thereby, when the light reflected to the side of the former, i.e. the light which has been reflected by the scanning mirror in 45 degrees or more, is reflected by the curved reflecting mirror to scan the object, the speed for scanning the object becomes faster than the speed for scanning the object of the prior art. Further, when the light reflected to the side of the latter, i.e. the light which has been reflected by the scanning mirror in less than 45 degrees, is reflected by the curved reflecting mirror to scan the object, the speed for scanning the object becomes slower than the speed for scanning the object of the prior art.

As explained with reference to the prior art, in the laser scanner in which the polygon mirror is used as the scanning mirror, the speed for scanning the curved reflecting mirror by the light which has been reflected by the scanning mirror in 45 degrees or more is slower and the speed for scanning the curved reflecting mirror by the light which has been reflected by the scanning mirror in less than 45 degrees is faster as compared to the speed for scanning the curved reflecting mirror when an one-plane mirror is used as the scanning mirror when the radius of curvatures of the curved reflecting mirror are equal. Because the object scanning speed is corrected as described above by the curved reflecting mirror in the inventive optical scanning apparatus, the error of the scanning speed explained with reference to the prior art may be canceled. Accordingly, the object may be scanned almost at a fixed speed. Thus, the present invention provides the curved reflecting mirror which can scan with less fθ correction error during scanning than the prior art curved reflecting mirror.

In a third aspect the invention is characterized in that the curved profile of the reflecting plane of the curved reflecting mirror along the locus is formed such that a radius of curvature of one of the two portions of the curved profile on a side opposite to a light incident side with respect to a reference axis parallel with a direction in which the light is reflected by the scanning mirror to the scanning center point, the reference axis passing a point at which the light is reflected within the reflecting plane of the scanning mirror when the light is reflected to the ends of the locus, is equal from the scanning center point to the end of the reflecting plane and a radius of curvature of the other of the two portions of the curved profile on the light incident side with respect to the reference axis decreases from the scanning center point to the end of the reflecting plane.

According to the third aspect of the invention, the curved plane of the curved reflecting mirror is formed so that its radius of curvature turns out as described above. Thereby, when the radius of curvature at the scanning center point is equal with the radius of curvature of the prior art curved reflecting mirror, the radius of curvature is equal with the radius of curvature of the prior art curved reflecting mirror whose radius of curvature is fixed on the side of the former and the radius of curvature is shorter than the radius of curvature of the prior art curved reflecting mirror on the side of the latter. Thereby, the object scanning speed in scanning the object by reflecting the light reflected to the side of the former by the curved reflecting mirror is equal with the object scanning speed of the prior art. Further, when the light reflected to the side of the latter is reflected by the curved reflecting mirror to scan the object, the object scanning speed is slower as compared to the object scanning speed of the prior art as described in the second aspect of the invention.

It can be seen from the experimental results described later that in the prior art laser scanner, although the fθ correction error of the object scanning speed in scanning the object by reflecting the light reflected to the side of the former by the prior art curved reflecting mirror increases linearly in proportional to a deflection angle made between the direction in which the light is inputted to the curved reflecting mirror and the reference axis, the fθ correction error of the object scanning speed in scanning the object by reflecting the light reflected to the side of the latter by the prior art curved reflecting mirror increases/decreases regardless of the deflection angle. Therefore, when the curved plane is formed as described above, the error of the scanning speed explained in the prior art may be canceled because the object scanning speed in scanning the object by reflecting the light reflected to the side of the latter by the curved reflecting mirror of the present invention is corrected as explained in the second aspect of the invention. Accordingly, the object to be scanned may be scanned almost at a fixed speed. Thus, the present invention provides the curved reflecting mirror which can scan with less fθ correction error during scanning than the prior art curved reflecting mirror.

In a fourth aspect the invention is characterized in that the reflecting planes of the scanning mirror are separated from the center in rotating the scanning mirror.

According to the fourth aspect of the invention, the scanning mirror is formed as described above. A so-called polygon mirror or a thick one-plane mirror may be cited as such a mirror. It allows a surface of an object to be scanned almost at a fixed speed in conjunction with the correcting characteristics of the curved reflecting mirror described above. Accordingly, it allows the object to be scanned at high speed and the fθ correction error at that time to be lessened. Further, because it is formed such that the axis which is the center of rotation thereof does not pass through the reflecting plane, an axis which becomes the direct center of rotation may be provided in the scanning mirror and the structure thereof and the rotating means may be simplified.

In a fifth aspect the invention is characterized in that the scanning mirror is a polygon mirror having a plurality of reflecting planes.

According to the fifth aspect of the invention, the scanning mirror is formed as described above. Such a polygon mirror includes a polygon mirror in which each side face of a prism whose bottom is polygonal is the reflecting plane. Such a polygon mirror allows a scanning speed to be increased by increasing a number of reflecting planes without changing the speed of rotation Accordingly, it allows the scanning speed to be increased readily. Further, although such a polygon mirror produces an error in the scanning speed due to the move of the reflecting point as described above because the center of rotation does not coincide with the reflecting plane, it may be corrected by the inventive curved reflecting mirror. Thereby, the surface of the object may be scanned while keeping a faster scanning speed than the scanning speed when the one-plane mirror is used as the scanning mirror, in conjunction with the correcting characteristics of the curved reflecting mirror described above. Accordingly, the fast scan may be implemented with less fθ correction error.

In a sixth aspect the invention is characterized in that the curved profile of the reflecting plane of the curved reflecting mirror along an axis vertical to the above-mentioned locus is elliptical.

According to the sixth aspect of the invention, the curved plane of the curved reflecting mirror is formed as described above. Thereby, when the light reflected by the scanning mirror deviates along the axis from the locus, the curved reflecting mirror reflects this light toward the center of the ellipse. Accordingly, because the curved reflecting mirror reflects the light while correcting so that the light heads to a focal point set on the object when the light reflected by the scanning mirror deviates along the axis, the out-of-focus of the light may be reduced.

In a seventh aspect the invention is characterized in that the optical scanning apparatus further comprises condenser lens means, disposed between the light source and the scanning mirror, for condensing light emitted from the light source.

According to the seventh aspect of the invention, the light emitted from the light source of the optical scanning apparatus is condensed by the condenser lens means and is then reflected by the scanning mirror. Thereby, an area in which the light hits on the object may be reduced. Accordingly, the use of the inventive optical scanning apparatus allows a clear image to be drawn in drawing the image by distributing spots where light hits and spots where light does not hit on a photoreceptor, like an electronic photograph for example.

In an eighth aspect the invention is characterized in that the center of radius of curvature of the reflecting plane of the curved reflecting mirror is set on the reference axis.

According to the eighth aspect of the invention, because the center of the radius of curvature is set as described above, a point at which the curved reflecting mirror crosses with the reference axis does not coincide with the scanning center point. Thereby, the light reflected at the scanning center point in the reflecting plane of the curved reflecting mirror is reflected so as to approach to the reference axis rather than an optical path when the light has entered for example. Thereby, although the size of the range in which the light reflected to the side opposite to the light incident side beyond the reference axis, i.e. the first range, was different from that of the range in which the light reflected to the light incident side beyond the reference axis, i.e. the second range, in the prior art, the inventive curved reflecting mirror allows the sizes of these ranges to be corrected so that they become almost equal. Accordingly, it allows the object scanning speed to be corrected so that it becomes more uniform within the scanning range.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
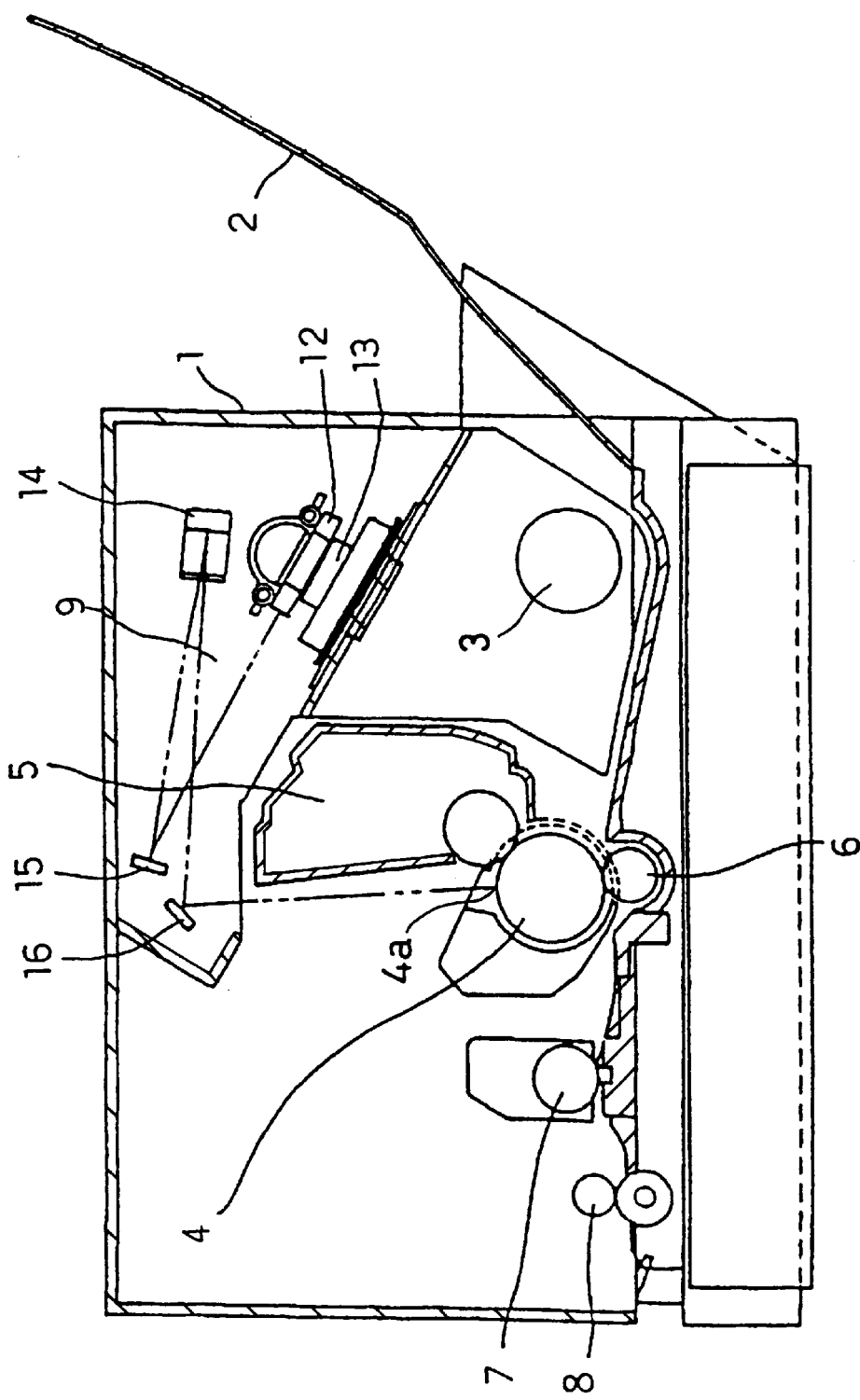
FIG. 1 is a front view showing a structure of a laser printer containing a laser scanner 9 of one embodiment of the present invention.

Now referring to the drawings, preferred embodiments of the invention are described below.

FIG. 1 is a front view showing a structure of a laser printer containing a laser scanner 9 of the present invention. The laser printer has a sheet stacker 2 for stacking sheets of paper on the side of the main body 1 of the equipment. Included within the main body 1 are a pickup roller 3, a photoreceptor 4, a developer 5, a transferrer 6, primary and secondary chargers, (not shown) a cleaner (not shown), a fixer 7, a discharge roller 8 and the laser scanner 9. The chargers, the developer 5, the transferrer 6 and the cleaner are disposed along a circumference of the cylindrical photoreceptor 4 in this order. The pickup roller 3, the photoreceptor 4, the fixer 7 and the discharge roller 8 are disposed in this order along a conveying path for conveying sheets of paper within the main body 1.

In printing an image with this laser printer, the cylindrical photoreceptor 4 rotates at first in a predetermined direction in which the parts from the chargers to the cleaner are disposed in the above-mentioned order centering on a center axis of rotation which passes through the center of bottom of the cylinder. The charger charges uniformly the surface of the photoreceptor 4, i.e. the side face of the cylinder. The laser scanner 9 forms an electronic latent image by scanning the surface of the charged photoreceptor in the direction parallel to the center axis of rotation of the photoreceptor 4 as the main scanning direction and in the direction parallel to the circumference of the photoreceptor 4 as the sub-scanning direction by laser light emitted from a laser oscillator which is controlled whether to emit the laser light or not corresponding to bits of binary image signals representing the image. Then, the developer develops the electronic latent image on the surface of the photoreceptor 4 by toner stored therein to form a toner image.

Sheets of paper stacked within the sheet stacker 2 are fed into the main body 1 one by one by the pickup roller 3 provided at a predetermined location downstream of the conveying path to be conveyed between the photoreceptor 4 on which the toner image has been formed and the transferrer 6. The transferrer 6 transfers the toner image on the surface of the photoreceptor 4 to the paper and conveys the transferred paper to the fixer 7 located at the downstream side of the conveying direction. The photoreceptor 4 from which the toner image has been transferred repeats the above-mentioned series of steps after removing toner remaining on the surface thereof by the cleaner. The fixer 7 fixes the toner image transferred to the paper by heating it. The paper on which the image has been fixed is discharged out of the main body 1 by the discharge roller 8 provided at the downstream side of the fixer 7 along the conveying direction.

Figure 2:
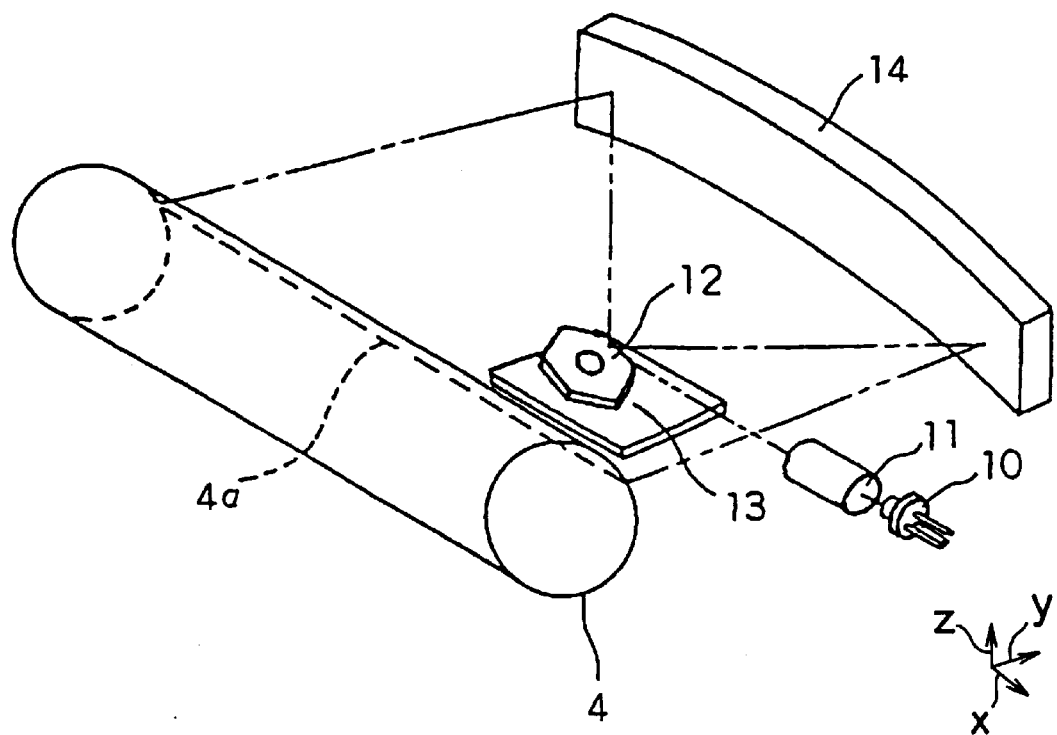
FIG. 2 is a perspective view showing a schematic structure of the laser scanner 9.
Figure 3:
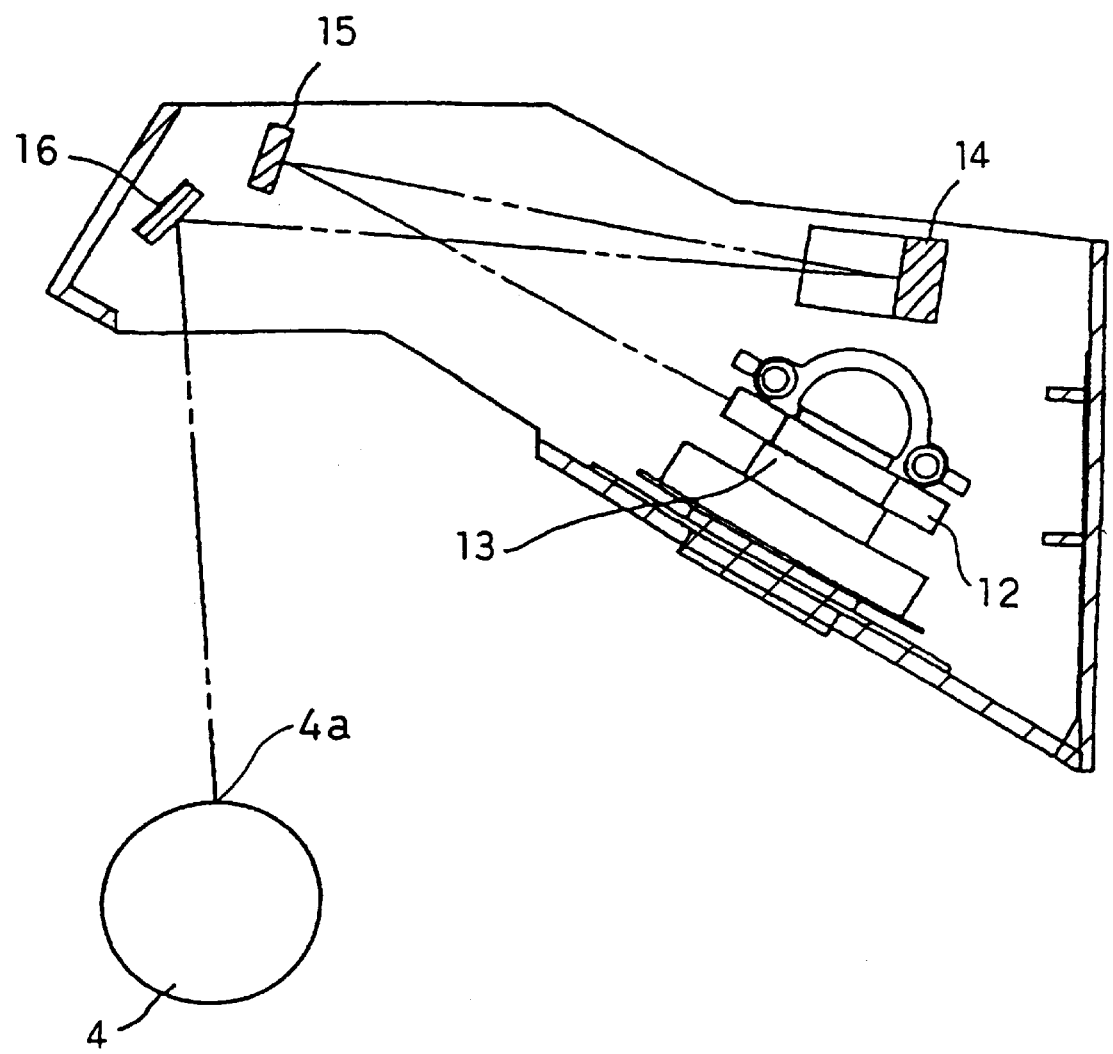
FIG. 3 is a section view showing the schematic structure of the laser scanner 9.

FIG. 2 is a perspective view showing a structure of the laser scanner 9 and FIG. 3 is a section view showing the structure of the laser scanner 9. The laser scanner 9 will be explained with reference to FIGS. 2 and 3. The laser scanner 9 comprises a laser oscillator 10, a condenser lens 11, a polygon mirror 12, a scanning section 13, a curved reflecting mirror 14, return mirrors 15 and 16. The return mirrors 15 and 16 are not shown in FIG. 2. In the drawings hereinbelow, the direction parallel with a center axis of rotation of the polygon mirror 12 will be indicated by an arrow z, the direction parallel with a reference axis 24 described later within a plane including the direction in which a laser beam is deflected by the polygon mirror 12 will be indicated by an arrow y and the direction vertical to the reference axis 24 within the plane will be indicated by an arrow x.

The laser oscillator 10 is a light source realized by a laser diode for example and emits laser light. The condenser lens 11 is interposed between the laser oscillator 10 and the polygon mirror 12 to condense the laser light emitted from the laser oscillator 10 as a laser beam. The polygon mirror 12 is a scanning mirror for deflecting the laser beam as a scanning laser beam. In concrete, it is a rotational polygon mirror having a plurality of reflecting planes for reflecting the laser beam. For example, the polygon mirror 12 may be a prism whose bottom is polygonal and which is rotated centering on an axis which passes through the center of an inscribed circle of the bottom and which is parallel with the side faces. The scanning section 13 turns the polygon mirror 12 at a predetermined speed of rotation centering on the center of rotation. The curved reflecting mirror 14 reflects the laser beam reflected by the polygon mirror 12 to the surface of the photoreceptor 4.

The return mirror 15 is disposed between the polygon mirror 12 and the curved reflecting mirror 14 to reflect and bend an optical path of the laser beam reflected by the polygon mirror 12 so as to guide the laser beam to the reflecting plane of the curved reflecting mirror 14. The return mirror 16 is disposed between the curved reflecting mirror 14 and the photoreceptor 4 to reflect and bend an optical path of the laser beam reflected by the curved reflecting mirror 14 to guide the laser beam to the surface of the photoreceptor 4.

Thereby, because the laser beam emitted from the laser oscillator 10 is reflected in an arbitrary direction by the polygon mirror 12, it scans a range of a predetermined angle of the reflecting plane of the curved reflecting mirror 14 primarily. Because this laser beam is also reflected by the curved reflecting mirror 14, it scans a predetermined linear scan line 4a on the surface of the photoreceptor 4 at a predetermined scanning speed. Because the scanning mirror is realized by the polygon mirror 12 here, the scanning speed may be readily increased in scanning the scan line by the laser beam.

Figure 4:
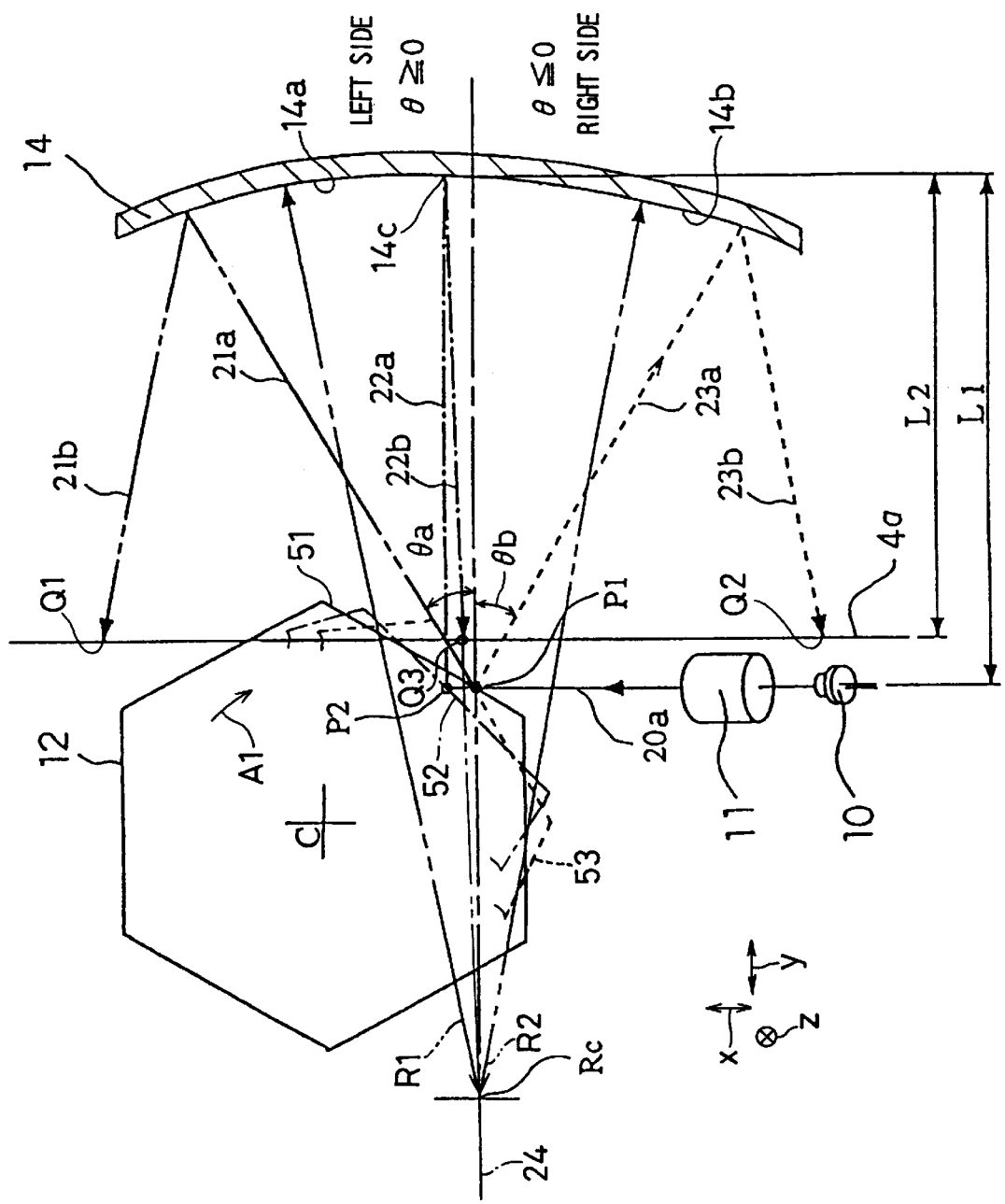
FIG. 4 is a diagrammatic view for explaining states of reflection of a laser beam exerted by a curved reflection mirror 14 of the laser scanner 9.

FIG. 4 is a diagrammatic view for explaining the profiles of the polygon mirror 12 and the curved reflecting mirror 14 as well as the positional relationship between the both mirrors 12 and 14.

The polygon mirror 12 is rotated in the direction of an arrow A1 by the scanning section 13. Along the rotation, an incident angle at which a laser beam 20a condensed by the condenser lens 11 enters the reflecting plane changes. Therefore, the laser beam 20a is deflected so as to scan a predetermined range of the reflecting plane of the curved reflecting mirror 14 sequentially by one reflecting plane of the polygon mirror 12.

The laser beam 20a which hits against one end and the other end of this range will be referred to as a leftmost scanning laser beam 21a and a rightmost scanning laser beam 23a. The leftmost scanning laser beam 21a is a laser beam produced when the laser beam 20a is reflected with an angle of reflection of more than 45 degrees and the rightmost scanning laser beam 23a is a laser beam produced when the laser beam 20a is reflected with an angle of reflection of less than 45 degrees. A reflected laser beam produced when the angle of reflection is 45 degrees will be referred to as a center laser beam 22a.

The center of rotation of the polygon mirror 12 is separated largely from each reflecting plane. Therefore, during when the laser beam 20a condensed by the condenser lens 11 is reflected by one reflecting plane of the polygon mirror 12, a reflecting point at which the laser beam 20a is reflected by the reflecting plane moves in correspondence to the rotation of the polygon mirror 12.

In concrete, in a first state in which the laser light starts to enter one reflecting plane, the reflecting plane is positioned so that the laser beam 20a enters the reflecting plane with an incident angle of more than 45 degrees as indicated by a solid line 51. In the first state, the laser beam 20a reflects at a reflecting point P1 and is deflected to the side opposite from the side where the laser beam 20 has entered beyond the reference axis 24 which passes through the reflecting point P1 and crosses at right angles with the incident direction of the laser beam 20a. When the polygon mirror 39 is rotated further from the first state, the reflecting plane is positioned such that the laser beam 20a enters the reflecting plane with an incident angle of 45 degrees as indicated by a two-dotted chain line 52. In the second state, the laser beam 20a is reflected at a reflecting point P2 and is deflected in the direction parallel with the reference axis 24. The reflecting point P2 is located on an imaginary line containing the optical path of the laser beam 20a and behind the reflecting point P1 in the incident direction of the laser beam 20a. Therefore, the reflecting point moves in the same direction with the incident direction of the laser beam 20a from the reflecting point P1 to the reflecting point P2 during when the polygon mirror 12 is rotated so that the reflecting plane is put into the second state from the first state.

When the polygon mirror 12 is rotated further from the second state, the reflecting plane is positioned such that the laser beam 20a enters the reflecting plane with an incident angle of less than 45 degrees as indicated by a broken line 53. In this third state, the laser beam 20a is reflected at the reflecting point P1 again and is deflected to the side where the laser beam 20 has entered beyond the reference axis 24. Therefore, the reflecting point moves in the direction opposite to the incident direction of the laser beam 20a from the reflecting point P2 to the reflecting point P1 during when the polygon mirror 12 is rotated such that the reflecting plane is put into the third state from the second state.

When the laser beam is deflected as described above, an angle made between the reference axis 24 and the reflected laser beam will be referred to as a deflection angle θ. The laser beam deflected to the side opposite from the side to which the laser beam 20a has been inputted, beyond the reference axis 24, will be assumed to have a deflection angle θ of a positive value and the laser beam deflected to the side to which the laser beam 20a has been inputted, beyond the reference axis 24, will be assumed to have a deflection angle θ of a negative value. An angle made between the leftmost scanning laser beam 21a and the reference axis 24 will be referred to as a left maxi-mum deflection angle θa and an angle made between the rightmost scanning laser beam 23a and the reference axis 24 will be referred to as a right maximum deflection angle θb.

In the reflecting plane of the curved reflecting mirror 14, a part reflecting the laser beam from the leftmost scanning laser beam 21a to the center scanning laser beam 22a will be referred to as a left part 14a and the part thereof reflecting the laser beam from the center scanning laser beam 22a to the rightmost scanning laser beam 23a will be referred to as a right part 14b. Further, in the reflecting plane of the curved reflecting mirror 14, a point at which the center scanning laser beam 22a hits will be referred to as a scanning center point 14c. A curved profile of the curved reflecting mirror 14 along a locus of a reflecting point reflecting the laser beam reflected by the polygon mirror 12, i.e. the curved profile in the main scanning direction, is asymuetrical at the left part 14a and the right part 14b bounding the scanning center point 14c.

On the whole, the closer to the end from the center of the curved reflecting mirror 14, the greater a radius of curvature of the left part 14a in the main scanning direction is. The closer to the end from the center of the curved reflecting mirror 14, the smaller the radius of curvature of the right part 14b in the main scanning direction. The reflecting plane of the curved reflecting mirror 14 is formed as described above to correct changes of the scanning speed which is caused by the move of the reflecting point on the polygon mirror 12 as described later. The increase/decrease of the radius of curvature is set such that the fθ correction error which is produced in the laser scanner using the prior art curved reflecting mirror 38 whose radius of curvature is fixed approaches zero.

A center RC of the radius of curvatures R1 and R2 of the left part 14a and the right part 14b are provided on the reference axis 24. The reference axis 24 is parallel with the center scanning laser beam 22a and passes through the reflecting point P1. The reflecting direction of the laser beam may be corrected so that the laser beam reflected by the curved reflecting mirror 14 is irradiated uniformly to the surface of the photoreceptor 4 by providing the curved reflecting mirror 14 based on the reflecting point of the polygon mirror 12.

One example of a method for determining the radius of curvature of the curved reflecting mirror 14 in the main scanning direction will be described below. The radius of curvature R1 in the main scanning direction at one point in the left part 14a is a value obtained by adding a product of a deflection angle θ of the laser beam entered so as to reflect at that point and a predetermined constant K to a predetermined reference radius of curvature R0 as represented by the following expression. It is noted that the unit of this deflection angle is radian and the deflection angle θ is always a positive value in the left part 14a. The constant K is a value greater than zero, which changes mainly in connection with the diameter of an inscribed circle of the polygon mirror 12. The constant K may change depending on the number of reflecting planes of the polygon mirror. When the constant K is greater than zero, the radius of curvature R1 is greater than the reference radius of curvature. Thereby, the radius of curvature R1 increases in proportional to the deflection angle θ from the middle of the curved reflecting mirror 14 to the end thereof.

$$R1 = R0 + K \cdot \theta \tag{1}$$

The radius of curvature R2 in the main scanning direction at one point in the right part 14b is a value obtained by adding the product of the deflection angle θ of the laser beam entered so as to reflect at that point and the predetermined constant K to the predetermined reference radius of curvature R0 as represented by the following expression. Because the deflection angle θ is always a negative value in the right part 14b, the product is always a negative value and the radius of curvature R2 is smaller than the reference radius of curvature R0 also in the following expression. Thereby, the radius of curvature R2 decreases in proportional to the deflection angle θ from the middle of the curved reflecting mirror 14 to the end thereof.

$$R2 = R0 + K \cdot \theta \tag{2}$$

As described above, the reflecting plane of the curved reflecting mirror 14 is a curved plane which is asymmetrical on the right and left such that the magnitude and variation of the radius of curvature is different at the left part 14a and the right part 14b. Because the deflection angle of the center scanning laser beam is zero here, the both parts 14a and 14b is connected smoothly at the boundary of the left part 14a and the right part 14b.

The constant K is determined empirically for example. In concrete, a value greater than zero is selected as a candidate value of the constant K at first. Then, the candidate value is substituted into candidate values of Expressions 1 and 2 to determine a radius of curvature of a curved reflecting mirror and to calculate a fθ correction error based on the radius of curvature. A plurality of fθ correction errors are calculated by changing the candidate value and those fθ correction values are compared to set a candidate value when the error is least as the value of the constant K. For instance, in the case where the reference radius of curvature R0 is 660 m, and the diameter of the inscribed circle of the polygon mirror 12 is in a range of 30 to 40 mm, if an integer greater than zero is selected as the candidate value of the constant K, the fθ error gradually decreases in the case where the candidate value increases from 1 to 5, and increases in the case where the candidate value increases from 5, namely, the fθ error becomes a minimum when the constant K is set to 5. Accordingly it is preferable to set the constant k to 5.

The radius of curvature of the curved reflecting mirror 14 in the main scanning direction may be increased or decreased gradually from the middle of the curved reflecting mirror 14 to the end thereof. When the radius of curvature is proportioned to the deflection angle θ as described above, the variation of the radius of curvature meets the above-mentioned condition and becomes simplest and smooth. Because the curved plane whose radius of curvature changes as such may be readily formed, it is preferable to change the radius of curvature in proportion to the deflection angle θ. Further, when the radius of curvature is determined based on Expressions 1 and 2, the constant K is preferable to be an integer in order to simplify the calculation of the radius of curvature.

A range in the scanning line 4a on the photoreceptor 4 from a point Q1 to which a leftmost laser beam 21b hits to a point Q2 to which a rightmost laser beam 23b hits will be referred to as a scanning range on the object. The leftmost and rightmost laser beams are laser beams which are obtained after reflecting the leftmost scanning laser beam 21a and the rightmost scanning laser beam 23a by the curved reflecting mirror 14. While the reflecting point of the center scanning laser beam 22a, when reflected by the polygon mirror 12, is shifted to the side opposite from the side to which the center scanning laser beam 22a is inputted beyond the reference axis 24, the reflected light of the center scanning laser beam 22a hits against the position shifted to the side opposite from the center Q3 of the scanning range on the object because the center scanning laser beam 22a is inputted vertically to the reflecting plane in the arrangement of the prior art curved reflecting mirror. According to the arrangement of the curved reflecting mirror 14 of the present embodiment, the center scanning laser beam 22a returns in the direction approaching to the reference axis as indicated by an arrow 22b after being reflected by the curved reflecting mirror 14 and hits against the center Q3 of the scanning range on the object.

Figure 5:
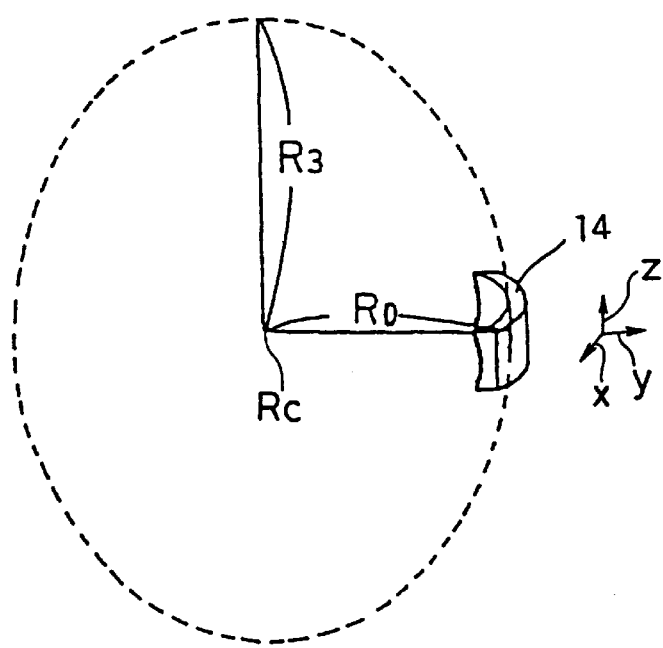
FIG. 5 is a perspective view showing the curved reflection mirror 14.

As shown in FIG. 5, the curved profile of the curved reflecting mirror 14 on an imaginary axis vertical to the above-mentioned locus, i.e. the curved profile in the sub-scanning direction, is an ellipse whose major axis R3 is parallel with the reference axis 24, whose minor axis is equal to the above-mentioned reference radius of curvature R0 and whose center is the above-mentioned center Rc. Thereby, the laser beam is reflected toward the center Rc even if the laser beam reflected by the polygon mirror 12 deviates in the sub-scanning direction. It then allows an out-of-focus of the laser beam in the main scanning direction and the sub-scanning direction to be reduced.

An operation of the laser scanner 9 will be explained below in detail with reference to FIGS. 2 and 3. The laser light emitted from the laser oscillator 10 enters the condenser lens 11. The condenser lens 11 condenses this laser light as a convergent laser beam having a finite focal point. The laser beam enters one of the reflecting planes of the polygon mirror 12. Because the polygon mirror 12 is rotated by the scanning section 13 centering on the center of rotation C at a predetermined speed of rotation, the direction of the laser beam inputted to the polygon mirror 12 to be deflected corresponding to the rotation of the polygon mirror 12 is changed. Thereby, the laser beam is deflected within a predetermined angular range within one plane and becomes a scanning laser beam which scans an imaginary line segment on the reflecting plane of the curved reflecting mirror 14. This scanning laser beam is reflected by the curved reflecting mirror 14 and reaches the scanning line 4a on the photoreceptor 4. Because the photoreceptor 4 is rotated in the sub-scanning direction, the surface of the photoreceptor 4 is scanned by this laser beam in an order of so-called raster. Because the curved profile of the curved reflecting mirror 14 in the main scanning direction is formed to be asymmetrical at the left and right parts, the object scanning speed, i.e. the speed of the laser beam in scanning the scanning line 4a, is corrected so that it settles at a predetermined fixed speed.

That is, the reflecting point of the laser beam on the polygon mirror 12 moves from the reflecting point P1 to the reflecting point P2 in scanning from the leftmost scanning laser beam 21a to the center scanning laser beam 22a. In other words, the reflecting point of the laser beam moves to the side opposite from the side to which the laser beam 20 has been inputted from the reference axis 24 during when the laser beam is reflected to the left part 14a by the polygon mirror 12. Therefore, as described with reference to the prior art, the speed for scanning the curved reflecting mirror by this scanning laser beam becomes slower than the speed for scanning the prior art curved reflecting mirror. The speed for scanning the object by the laser beam reflected by the curved reflecting mirror 14 becomes faster than the scanning speed before the reflection by forming the left part 14a as described above in advance.

The reflecting point of the laser beam moves also from the reflecting point P2 to the reflecting point P1 in scanning from the center scanning laser beam 22a to the rightmost scanning laser beam 23a. That is, the reflecting point of the laser beam moves from the side opposite to the side to which the laser beam 20 has been inputted beyond the reference axis 24 to the reference axis 24 during when the laser beam is reflected to the right part 14b by the polygon mirror 12. Due to that, the speed for scanning the curved reflecting mirror by this scanning laser beam becomes faster than the speed for scanning the prior art curved reflecting mirror as explained in the Description of the Related Art. The object scanning speed of the laser beam reflected by the curved reflecting mirror 14 becomes slower than the scanning speed of the laser beam before the reflection by forming the right part 14b as described above. Thereby, the object scanning speed of the laser beam reflected by the curved reflecting mirror 14 becomes almost equal at the left and right parts 14a and 14b.

Thereby, the object scanning speed may be kept always at a predetermined speed regardless of the move of the reflecting point on the polygon mirror 12. Further, because the polygon mirror is used as the scanning mirror, the scanning speed of the laser beam in the scanning mirror may be increased readily. Accordingly, because the surface of the photoreceptor may be scanned at high speed almost at a predetermined speed by the laser scanner of the present embodiment by using the polygon mirror as the scanning mirror and by correcting the scanning speed by the curved reflecting mirror, fast scan may be carried out with less fθ correction error.

A function for correcting the object scanning speed using the curved reflecting mirror 14 will be explained by comparing the prior art curved reflecting mirror 38 which is a spherical mirror whose reflecting plane is formed of a curved plane having a fixed radius of curvature with the curved reflecting mirror 14 of the present embodiment.

Assume here that the prior art curved reflecting mirror 38 has a radius of curvature of 660 mm. Assume also that the curved reflecting mirror 14 of the present embodiment has a reference radius of curvature R0 of 660 mm and the constant K of 5 and that a left maximum deflection angle θa is 30 degrees (0.524 radian) and a right maximum deflection angle θb is −30 degrees. Thereby, the radius of curvature R1 increases gradually from 660 mm to 662.62 mm from the middle to the end in the left part 14a of the curved reflecting mirror 14. The radius of curvature R2 decreases gradually from 660 mm to 657.38 mm from the middle to the end in the right part 14b of the curved reflecting mirror 14. Assume also in the both laser scanners of the prior art and the present embodiment that a distance L1 on the reference axis 24 from the polygon mirror 12 to the curved reflecting mirrors 14 and 38 is 206 mm, a distance L2 from the curved reflecting mirrors 14 and 38 to the scanning line 4a is 198 mm and an angle of the laser beam deflected by the polygon mirror 12 is ±30 degrees centering on the reference axis 24.

The scanning line 4a on the photoreceptor 4 was scanned by the laser scanner that satisfies the above conditions to find the relationship between the fθ correction error and the deflection angle of the laser beam at that time. The fθ correction error represents a dislocation from an ideal scanning position which is a position to which a laser beam is irradiated when the reflecting point does not move on the polygon mirror 12 in scanning the scanning line 4a by reflecting the scanning laser beam having a certain deflection angle by the curved reflecting mirror.

Figure 6:
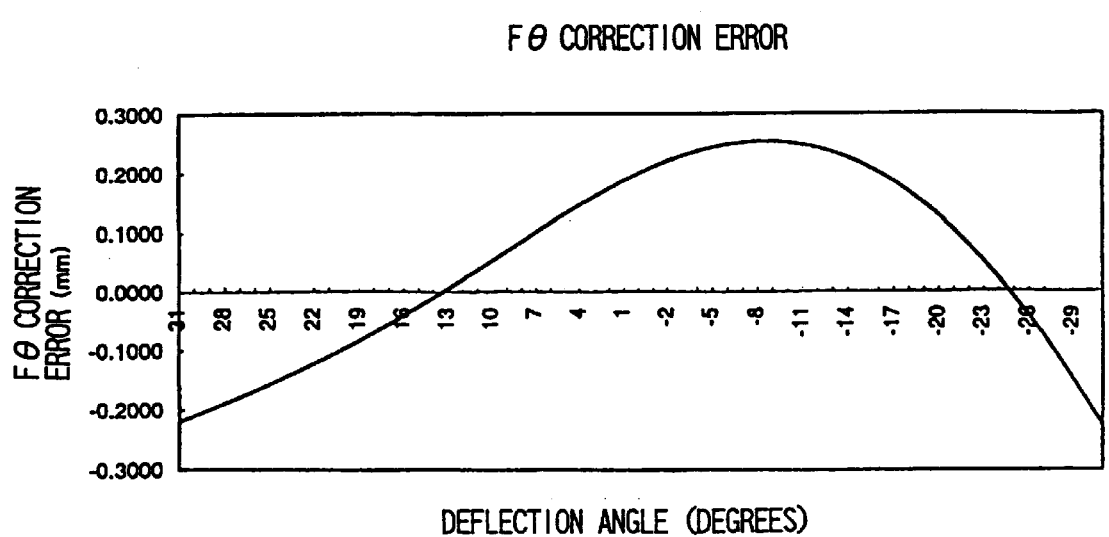
FIG. 6 is a characteristic graph showing the relationship between a fθ correction error and a deflection angle exerted by a curved reflection mirror 38 of a prior art laser scanner.

FIG. 6 is a graph showing the relationship between the fθ correction error and the deflection angle θ when the prior art curved reflecting mirror 38 is used as the curved reflecting mirror. It can be seen from this graph that when the curved reflecting mirror 38 is used, a fθ correction error as large as ±0.2 mm in maximum is produced corresponding to the move of the reflecting point on the polygon mirror 12. This fθ correction error increases almost linearly during when the deflection angle is a positive value and during when the deflection angle is a negative value, it increases during when the deflection angle is 0 degree to about −8 degrees and decreases when the angle turns out to be less than about −8 degrees.

Figure 7:
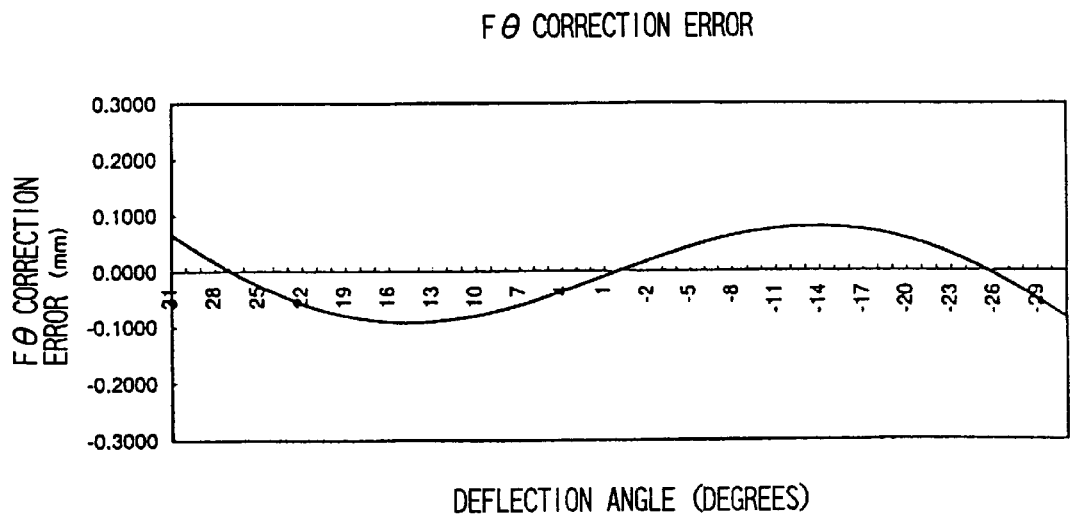
FIG. 7 is a characteristic graph showing the relationship between a fθ correction error and a deflection angle exerted by the curved reflection mirror 14 of the laser scanner 9 according to one embodiment of the present invention.

FIG. 7 is a graph showing the relationship between the fθ correction error and the deflection angle when the curved reflecting mirror 14 of the present embodiment is used as the curved reflecting mirror. It can be seen from this graph that when the curved reflecting mirror 14 of the present embodiment is used, the fθ correction error is always less than ±0.1 mm regardless of that the reflecting point moves on the polygon mirror 12. Thereby, the fθ correction error may be improved to a half or less as compared to the fθ correction error of the prior art.

It can be seen also from FIG. 6 that when the prior art curved reflecting mirror 38 is used, the fθ correction error linearly changes in the direction of increasing from the negative value as the deflection angle decreases from the left maximum deflection angle. Contrary to that, the fθ correction error increases once and decreases sharply on the way as the deflection angle decreases from zero degree. It can be seen from these facts that the degree of changes of the speed for scanning by the laser light reflected by the right part is larger than that of the speed for scanning by the laser light reflected by the left part. Thereby, the variation of the radius of curvature of the left part 14a may be increased more than the variation of the right part 14b in the curved reflecting mirror 14 of the present embodiment. For instance, when the radius of curvatures R1 and R2 are to be determined based on Expressions 1 and 2, the value of the constant in Expression 1 may be set at 5 and the value of the constant in Expression 2 at 10.

Further, while the scanning speed keeps a fixed value when the fθ correction error linearly changes, it means that the value thereof is deviating from a predetermined scanning speed. Because the fθ correction error of the left part among the f θ correction errors changes linearly as described above when the prior art curved reflecting mirror 38 is used, the speed for scanning the object by the laser light reflected by the left part is considered to be keeping a fixed value. From these facts, the speed for scanning the object by the laser light reflected by the curved reflecting mirror may be fixed even when the profile of the reflecting plane of only the right part is corrected such that the speed for scanning the object by the laser light reflected by the right part approaches to the speed for scanning the object by the laser light reflected by the left part without correcting the profile of the reflecting plane of the left part.

Figure 8:
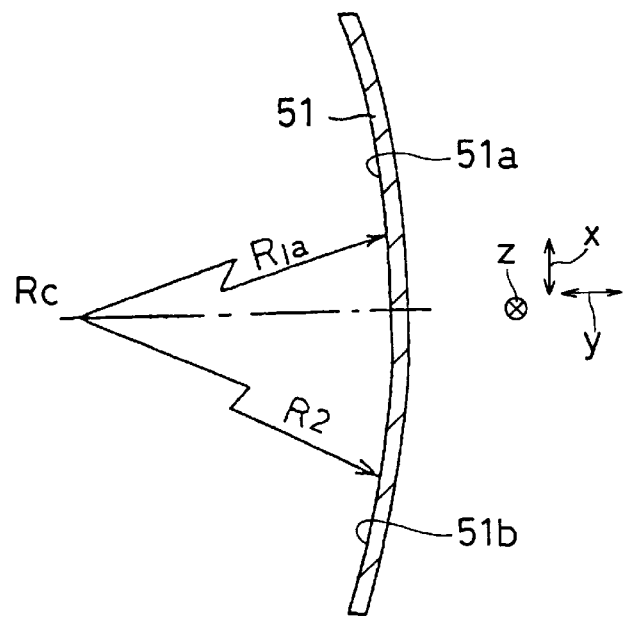
FIG. 8 is a section view showing a curved reflecting mirror 51 according to another embodiment of the present invention.

FIG. 8 is a section view showing a curved reflecting mirror 51 used in a laser scanner of another embodiment of the present invention. This curved reflecting mirror 51 is formed such that the left part of the curved profile in the main scanning direction is a curved plane whose radius of curvature is fixed similarly to the prior art and a radius of curvature of the right part is smaller than the fixed radius of curvature and reduces gradually in proportional to the deflection angle with reference to the curve shown in FIG. 6.

In concrete, a radius of curvature R1a of the left part 51a of the curved reflecting mirror 51 is set at 660 mm at any part. A radius of curvature R2 of the right part 51b is determined by using Expression (2), by setting a reference radius of curvature at 660 mm and by setting the constant K at 10. This constant K was determined by the same method as that for setting the constant K with respect to the curved reflecting mirror 14, assuming that the diameter of the inscribed circle is in a range of 30 mm to 40 mm. In this case the fθ error gradually decreases as the candidate value increases from 1 to 10, and gradually increases as the candidate value increases from 10. Thereby, the radius of curvature turned out to be 660+100 mm within the range in which the deflection angle θ is a positive value. The right and left maximum deflection angles θa and θb are also set at 30 degrees (±0.524 radian). Thereby, variation of the radius of curvature Rb becomes greater than the curved reflecting mirror 14 in the right part of the curved reflecting mirror. In concrete, the radius of curvature R2 decreases gradually from 660 mm to 654.76 mm from the middle to the end.

Figure 9:
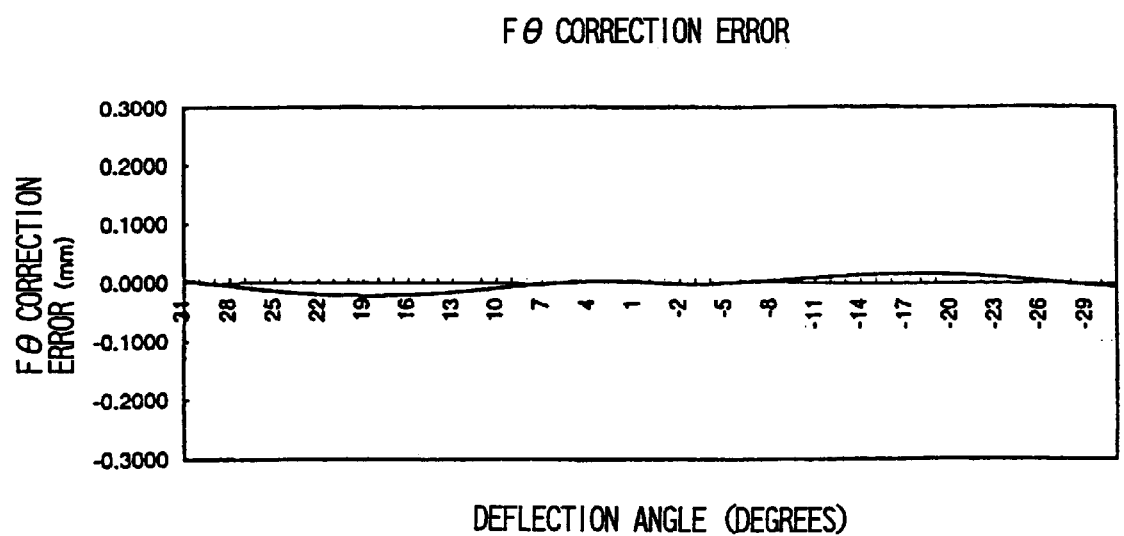
FIG. 9 is a characteristic graph showing the relationship between a fθ correction error and a deflection angle exerted by the curved reflection mirror 51 of the laser scanner having the curved reflecting mirror 51 shown in FIG. 8.
Figure 10:
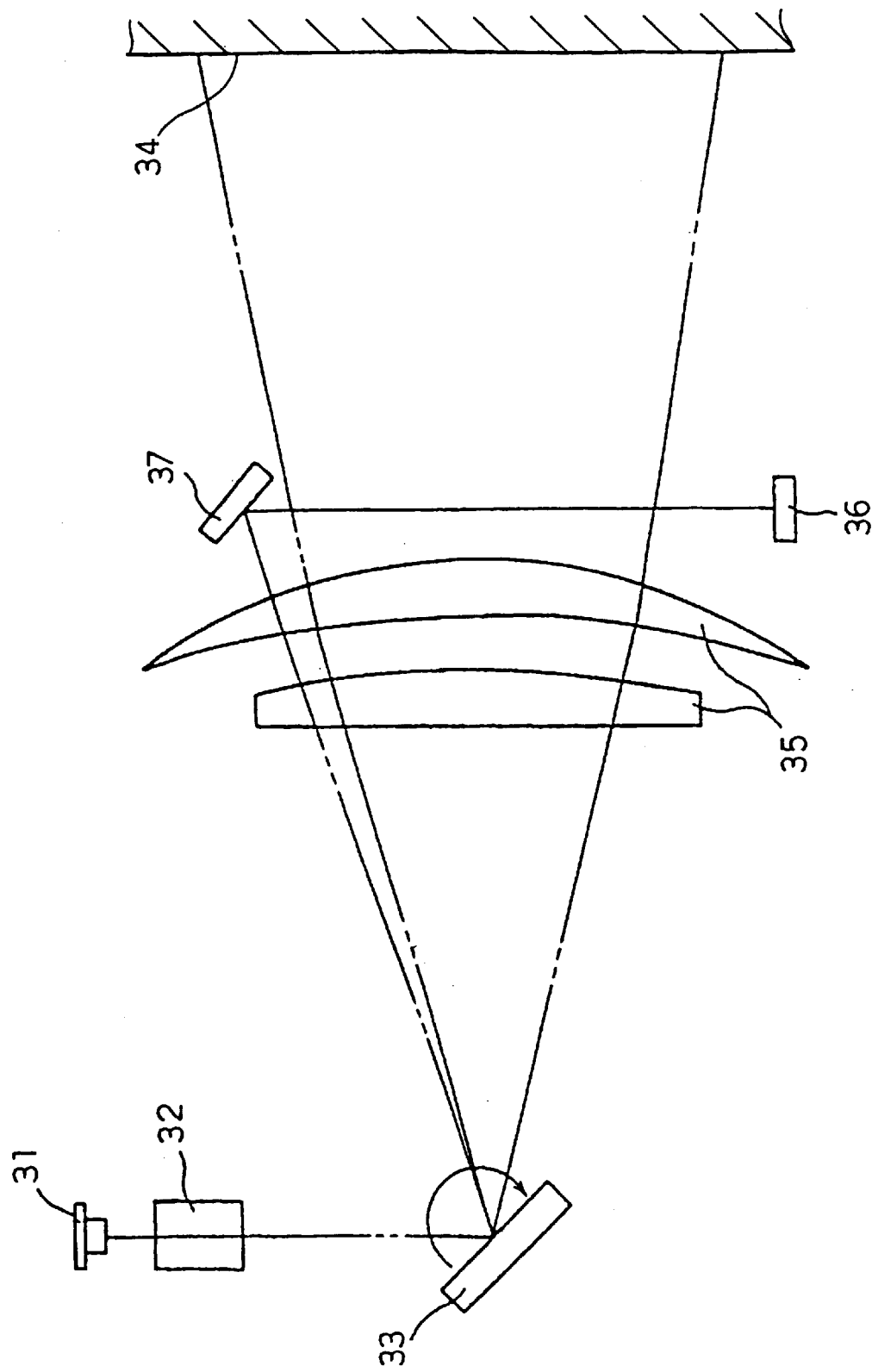
FIG. 10 is a diagram showing a schematic structure of a first prior art laser scanner using imaging lenses 35.
Figure 11:
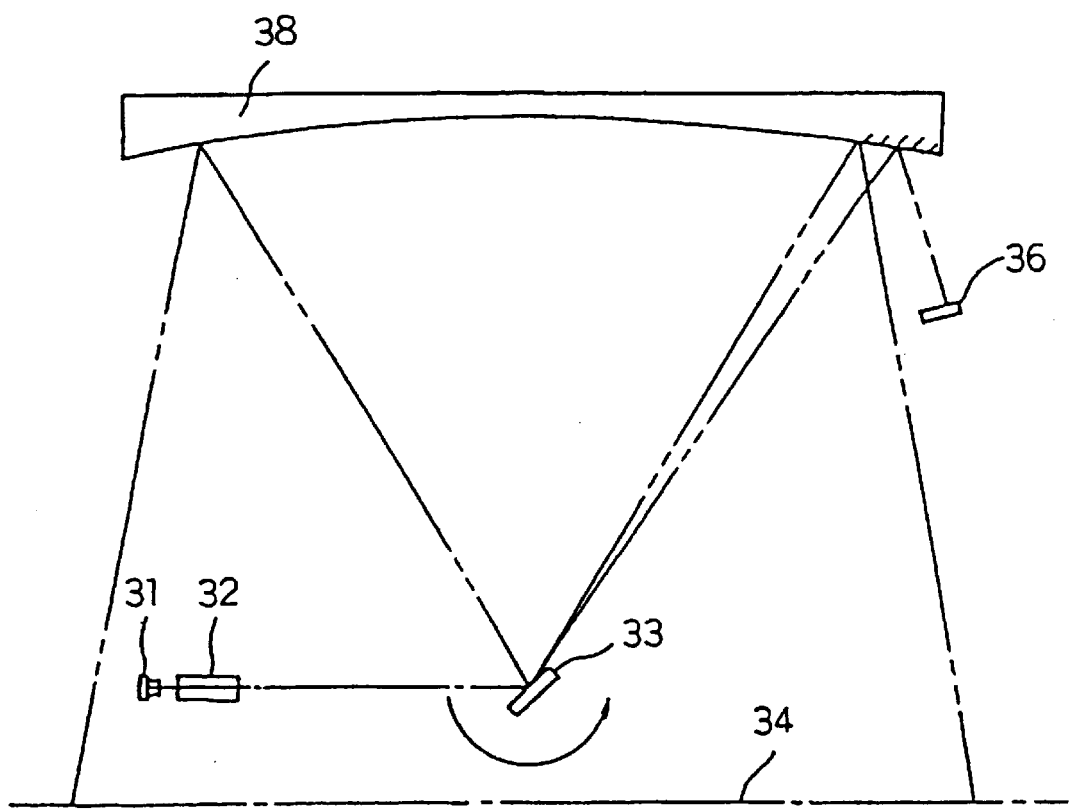
FIG. 11 is a diagram showing a schematic structure of a second prior art laser scanner using a curved reflecting mirror 38.
Figure 12:
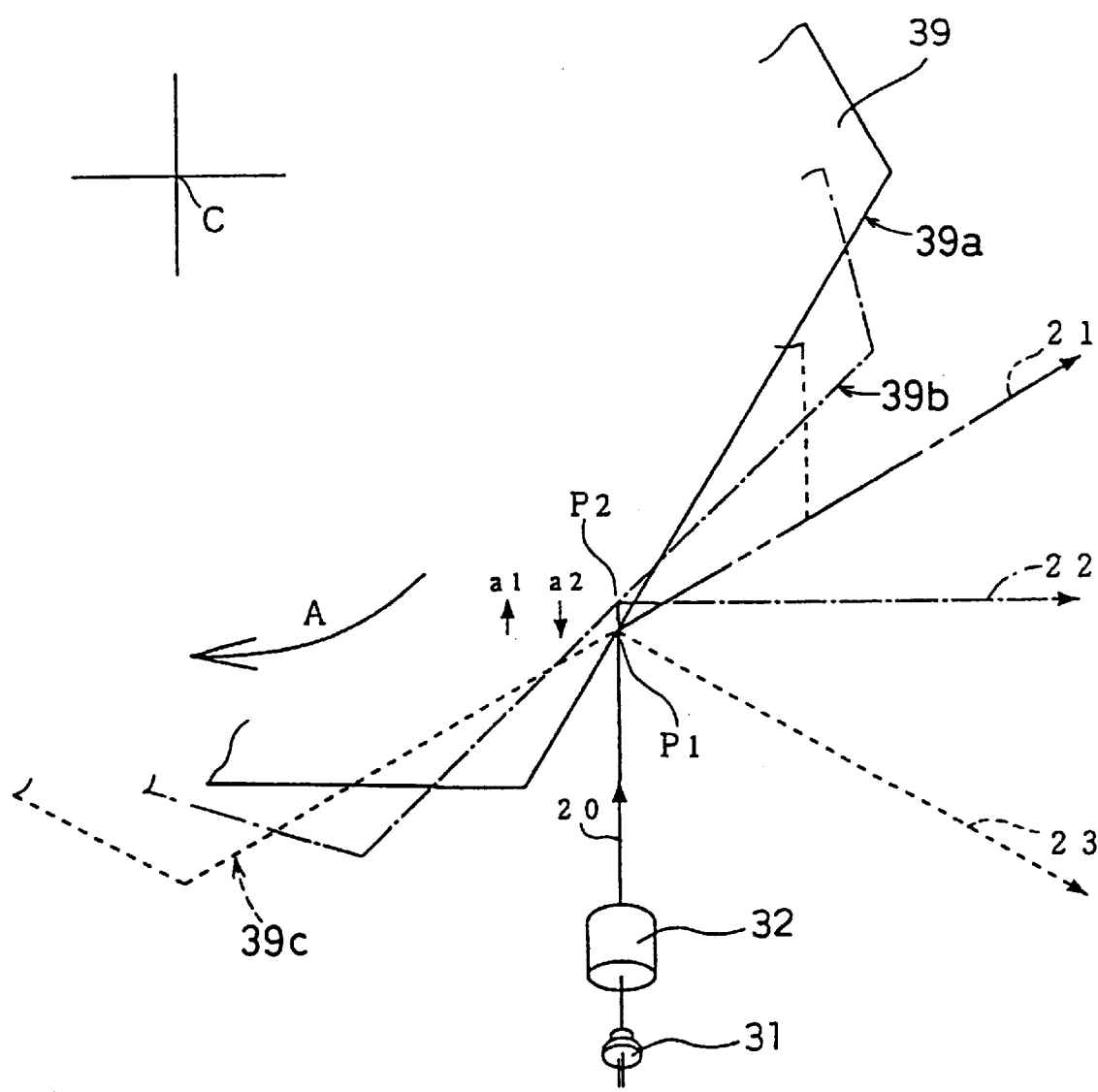
FIG. 12 is a diagrammatic view for explaining moves of a reflection point of a laser beam exerted by a polygon mirror 39 in the prior art laser scanner in which the polygon mirror 39 is adopted as a scanning mirror.

FIG. 9 is a graph showing the relationship between the fθ correction error and the deflection angle of a laser beam when the curved reflecting mirror 51 of another example of the present embodiment is used as the curved reflecting mirror 51. It can be seen from this graph that the fθ correction error is always less than ±0.02 mm even though the reflecting point moves on the polygon mirror. Thereby, the fθ correction error may be improved considerably such that it is less than ±0.02 mm as a whole.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical scanning apparatus comprising:

a light source for emitting light;

a scanning mirror having reflecting planes for reflecting the light emitted from the light source from an incident location thereon;

rotating means for rotating the scanning mirror; and a curved reflecting mirror having a curved reflecting surface for reflecting the light reflected by the reflecting planes of the scanning mirror to an object; wherein rotation of the scanning mirror moves the incident location of the reflected light along a locus on the curved reflecting surface of the curved reflecting mirror; and wherein the curved reflecting surface of the curved reflecting mirror is formed such that a first portion thereof from a scanning center area of the curved reflecting mirror which is a location at which the light is reflected when the light reflected by the reflecting surface of the curved reflecting mirror is reflected nearly toward the center of a scanning range to one end of the locus, and a second portion thereof from the scanning center point to another end of the locus are asymmetrical about the scanning center point of the curved reflecting mirror, and wherein the curved reflecting surface of the curved reflecting mirror has a light incident side which is a side of the curved reflecting mirror on which light reflected by the scanning mirror is incident relative to a reference axis parallel with the direction of the scanning mirror reflected light, the reference axis passing a point at which the light is reflected within the curved reflecting surface of the scanning mirror when the light is reflected to the ends of the locus, and wherein the curved reflecting mirror along the locus is formed such that:
(1) a first radius of curvature of one of the first and second portions thereof on a side opposite to the light incident side thereof is constant from the scanning center area to an end of the reflecting surface, and
(2) a second radius of curvature of another of the first and second portions thereof on the light incident side decreases from the scanning center area to another end of the reflecting surface.

2. The optical scanning apparatus of claim 1, wherein the reflecting planes of the scanning mirror are separated from a center of rotation of the scanning mirror.

3. The optical scanning apparatus of claim 1, wherein the scanning mirror is a polygon mirror having a plurality of reflecting planes.

4. The optical scanning apparatus of claim 1, wherein the curved reflecting surface of the curved reflecting mirror along an axis vertical to a plane defined by the locus is elliptical.

5. The optical scanning apparatus of claim 1, further comprising condenser lens means, disposed between the light source and the scanning mirror, for condensing light emitted from the light source.

6. The optical scanning apparatus of claim 1, wherein the curved reflecting surface of the curved reflecting mirror has a center of curvature which is coincident with the reference axis.

7. An optical scanning apparatus comprising:
a laser light source for emitting a laser beam along a light path;
a rotatable polygonal scanning mirror disposed in said light path of said laser light source and having a plurality of reflecting planes which reflect the laser light emitted by said laser light source along an optical scanning plane in a primary scanning direction defined between one end locus and another end locus of the reflected laser light; and
a curved reflecting mirror positioned to receive the reflected laser light by the rotatable polygonal scanning mirror along the optical scanning plane and to direct such reflected laser light to an object to be scanned; wherein
said curved reflecting mirror includes a curved reflecting surface having a first curved portion from a scanning center point thereof toward said one end locus of the optical scanning plane defined by a first radius of curvature which is constant, and a second curved portion from the scanning center point thereof toward said another end locus of the optical scanning plane defined by a second radius of curvature which is different from said first radius of curvature.

8. The optical scanning apparatus of claim 7, wherein said second radius of curvature decreases from said scanning center point toward said another end locus of the optical scanning plane.

9. The optical scanning apparatus of claim 8, wherein the second radius of curvature decreases in proportion to a deflection angle of the laser light reflected by the polygonal scanning mirror.

10. The optical scanning apparatus of claim 7, wherein the reflecting surface of the reflecting mirror has an elliptical curvature relative to a plane which is perpendicular to the optical scanning plane.

* * * * *